April 22, 1958 J. C. STAMPS 2,831,669
APPARATUS AND PROCESS FOR MANUFACTURING
DRY CHARGED STORAGE BATTERIES
Filed June 16, 1955 3 Sheets-Sheet 1

James C. Stamps
INVENTOR
BY
ATTORNEYS.

April 22, 1958  J. C. STAMPS  2,831,669
APPARATUS AND PROCESS FOR MANUFACTURING
DRY CHARGED STORAGE BATTERIES
Filed June 16, 1955  3 Sheets-Sheet 3

James C. Stamps
INVENTOR
BY CASnow &Co.
ATTORNEYS.

United States Patent Office
2,831,669
Patented Apr. 22, 1958

2,831,669

APPARATUS AND PROCESS FOR MANUFACTURING DRY CHARGED STORAGE BATTERIES

James C. Stamps, San Antonio, Tex., assignor to Standard Electric Company, Inc., San Antonio, Tex.

Application June 16, 1955, Serial No. 516,008

2 Claims. (Cl. 263—40)

This invention relates to an apparatus and process for manufacturing dry charged storage batteries.

An object of this invention is to provide an improved means and process or method of producing dry negative plates for lead-acid storage batteries, whereby the active material of the plates normally consisting of spongy metallic lead will not oxidize and thereby lose its charge when dry.

It is well known that at least one practice in the drying of negative plates for storage bateries, is to place the plates in an oven subjected to superheated steam. Under this process the negative plates retain a portion of the charge, but when the plates are assembled in the battery case and a quantity of acid is subsequently placed in the case, the battery has retained only between 50% and 80% of its electrical charge.

It is, therefore, an object of this invention to provide an improved apparatus and process for drying the negative plates of lead acid batteries in a manner whereby the plates will not become oxidized and will when in a dried condition, retain a higher percentage of the electric charge so that when the battery is assembled and subsequently filled with acid the charge will be between 85% and upwards of a completely charged battery.

A further object of this invention is to provide an improved method and apparatus whereby the negative plates may be quickly dried without oxidization of the plates.

In the carrying out of this invention, the wet and charged negative plates are placed in a closed chamber and this chamber is then subjected to a heating means whereby the oxygen in the chamber will be burned out, after which the chamber is subjected to further heat from infra-red lamps which are thermostatically controlled so as to produce an even heat of the temperature desired.

With the foregoing and other objects in view which will appear as the description proceeds, the invention consists of certain novel details of consrtuction and combinations of parts, hereinafter more fully described and pointed out in the claims, it being understood that changes may be made in the construction and arrangement of parts without departing from the spirit of the invention as claimed.

Referring to the drawings.

Figure 1:
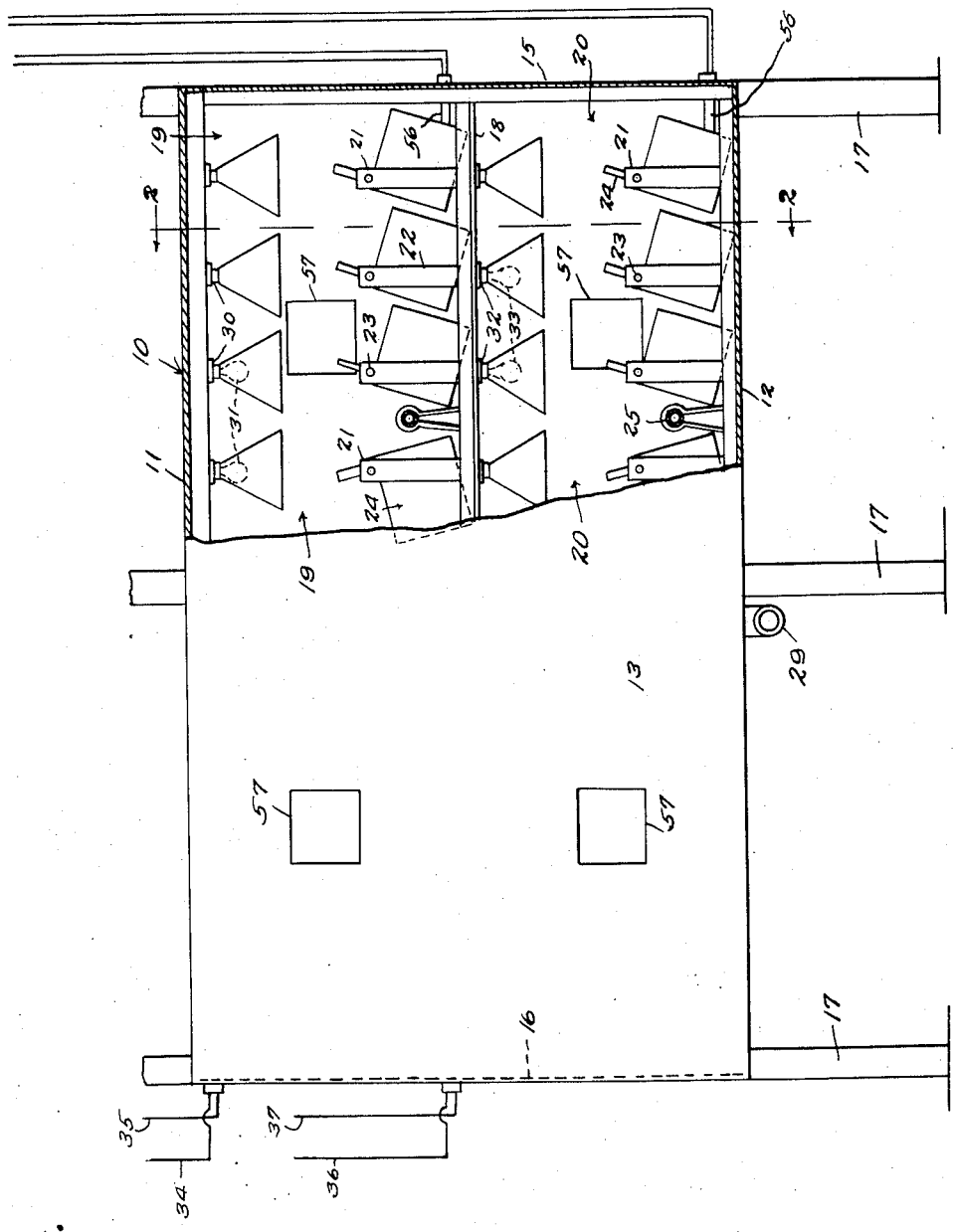
Figure 1 is a detail front elevation partly broken away and in section, of a battery plated drying oven constructed according to an embodiment of this invention.
Figure 2:
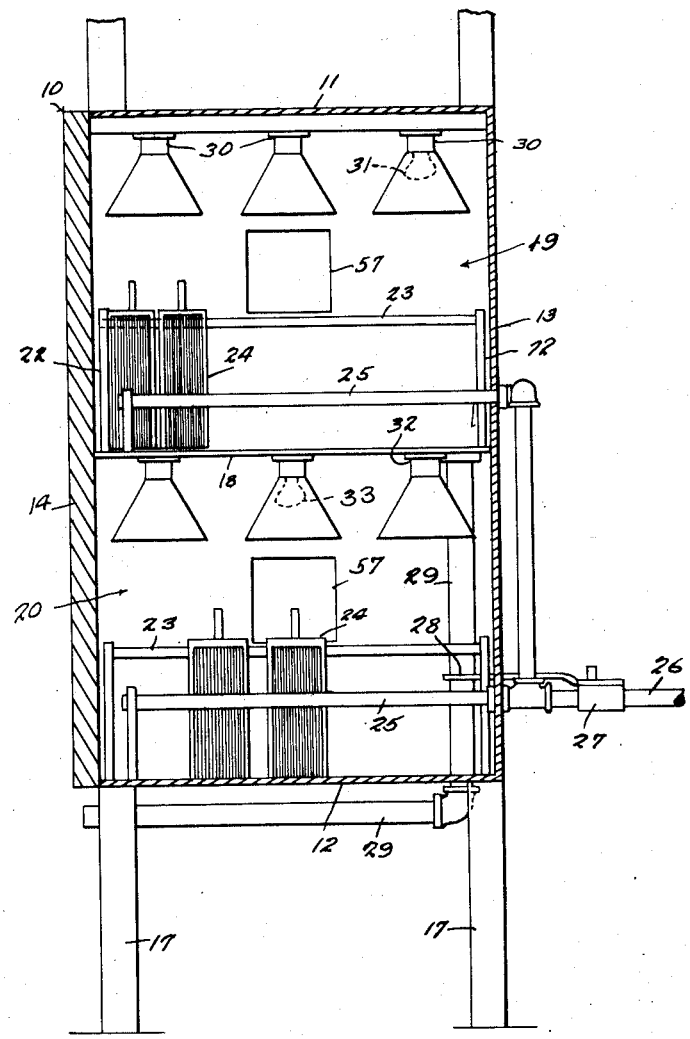
Fig. 2 is a sectional view taken on line 2—2 of Fig. 1.
Figure 3:
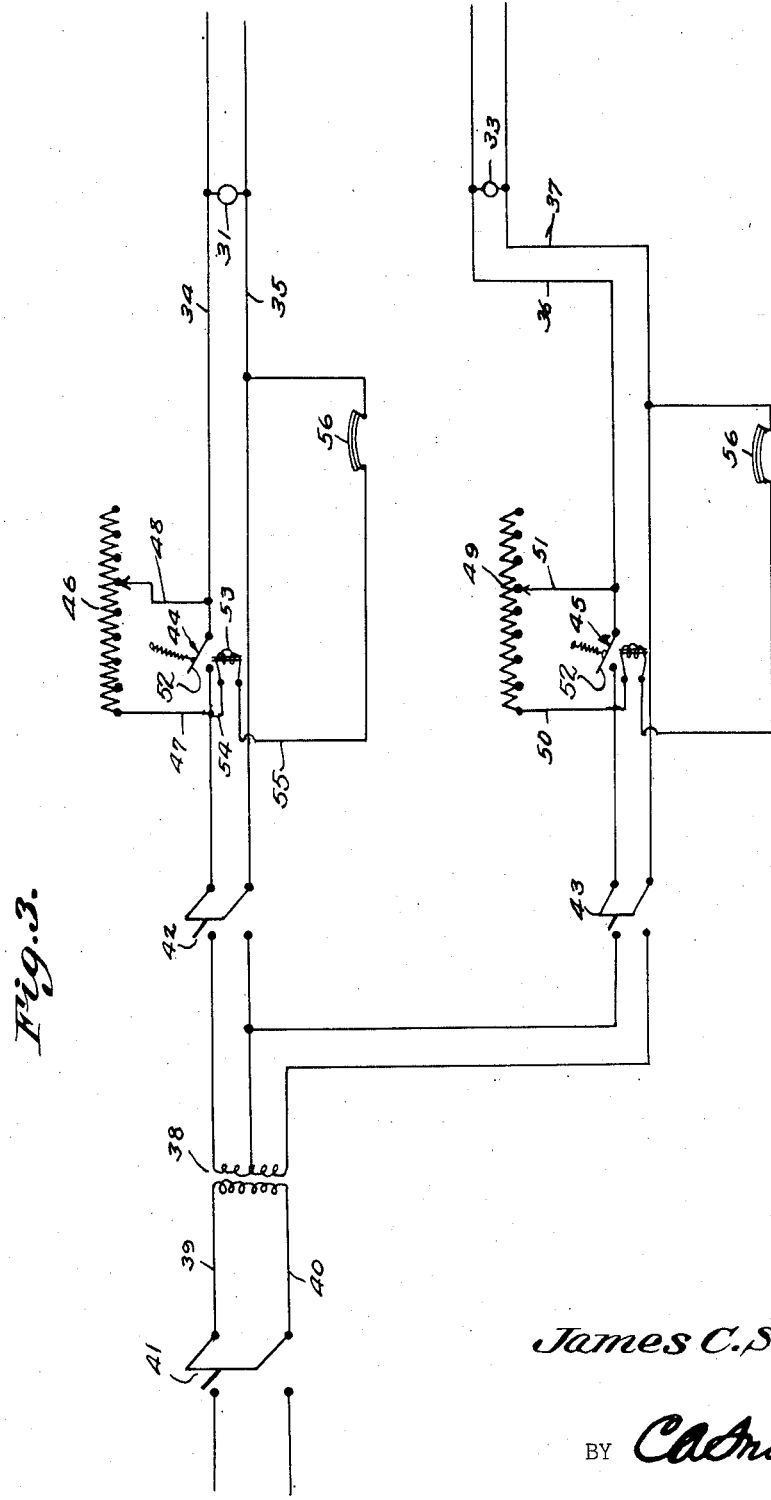
Fig. 3 is a schematic view showing the electric circuits embodied in this invention.

Referring to the drawings, the numeral 10 designates generally an oven which is formed of top and bottom walls 11 and 12, respectively, the rear wall 13 and the front wall 14 which constitutes a closure assembly being mounted on the front of the oven. The oven also includes end walls 15 and 16. The oven may be supported on legs or other supports 17 and is of a sufficient size to hold a series of negative battery plate units, as will be hereinafter described. The over 10 has an inner horizontal wall 18 disposed therein, which divides the interior of the oven into upper and lower chambers 19 and 20, respectively. The inner wall 18 has secured thereto a plurality of spaced apart plate unit supporting racks generally indicated at 21. These racks 21 are formed of upstanding end bars 22 with a removable horizontal bar or rod 23 with which negative plate units 24 are adapted to be engaged. These plate units 24 are disposed on an angle to the vertical, as shown in Fig. 1, so that heated air or gas may freely circulate about the entire area of each battery unit. The oven 10 has positioned in each chamber 19 and 20, a plurality of horizontally disposed transversely extending tubular burners 25 which are connected to a gas supply line 26. A thermo metal valve 27 having a valve operating element 28 connected therewith is interposed in the fuel supply line 26 with the valve regulating member 28 projecting through the rear wall 13 and into the lower chamber 20. A liquid drain pipe 29 is connected to the chambers 19 and 20 whereby the moisture in the chambers 19 and 20 driven out of the battery plates, will be drained from the heating chambers 19 and 20. The upper chamber 19 has positioned therein a plurality of lamp sockets 30 with which inra-red lamps 31 are engaged and the lower chamber 20 has a plurality of light sockets 32 with which infra-red lamps 33 are engaged.

In order to provide a means whereby the heat generated by the infra-red lamps 31 and 33 may be closely regulated, I have provided an improved electric controlling circuit for each chamber. The upper lamps 31 are interposed in an upper electric circuit formed of conductors 34 and 35 and the lower lamps 33 are interposed in a lower electric circuit formed of conductors 36 and 37. The conductors 34, 35, 36 and 37 are connected to a stepdown transformer 38 which is connected by conductors 39 and 40 to an electric supply source. A double-pole manual switch 41 is interposed in conductors 39 and 40. A double-pole manual switch 42 is interposed in conductors 34 and 35 and a double-pole manual switch 43 is interposed in conductors 36 and 37. An electromagnetic switch 44 is interposed in conductor 34 between switch 42 and lamps 31 and a second electro-magnetic switch 45 is interposed in conductor 36 between switch 43 and lamps 33. An adjustable bridging resistor 46 bridges the switch 44 being connected with conductor 34 by conductors 47 and 48. A second bridging resistor 49 bridges switch 45 and resistor 49 is connected with conductor 36 by means of conductors 50 and 51.

The electro-magnetic switches 44 and 45 are of like construction and each includes a spring-pressed movable blade 52 which is constantly urged to open position and is closed by energizing of an electric magnetic coil 53. One end of coil 53 is connected by a conductor 54 to conductor 34 and the other end of coil 53 is connected by means of a conductor 55 to conductor 36. A thermostatic switch 56 of conventional construction and preferably of the bulb type, is interposed in conductor 55 and thermostat 56 is mounted in chamber 19. A similar thermostatic switch 56 is mounted in lower chamber 20.

In the use and operation of this invention the plate units 24 which are filled with spongy metallic lead and when fully charged, are placed in chambers 19 and 20 on the racks 21. At the start of the drying process, because burners 25 are lighted with valve 27 in an open position, when the oxygen in chambers 19 and 20 has been exhausted, burners 25 will go out and valve 27 will be moved to a closed position. The oven 10 is provided with a series of transparent windows or peep holes 57 so that the condition of the gas burners 25 may be readily viewed from the exterior of the oven structure. When the burners go out by exhausting the oxygen in the heating chambers 19 and 20, switches 41, 42 and 43 may then be manually closed.

Inasmuch as thermostatic switches 56 are initially normally in closed position, electro-magnetic switches 44 and 45 will be closed so that the electric current will by-pass the resistors 46 and 49. With switches 56 closed, the lamps 31 and 33 will be lighted to their maximum degree and after the chambers 19 and 20 reach a predetermined temperature, thermostatic switches 56 will open, thereby opening switches 44 and 45. The electric current to the lamps 31 and 33 will thereby pass through the resistors 46 and 49, respectively. In this manner the temperature in each drying chamber can be very closely regulated and an initially light temperature generated by the lamps 31 and 33 under a minimum current power.

With a process and apparatus as herein described, the negative battery plates will be dried in a minimum period of time and a high percentage of the initial charge of the battery plates will be retained. The battery plates will not be oxidized so that when the plates are assembled in a battery case, the battery will immediately be virtually fully charged when the acid is poured into the cells.

What is claimed is:

1. In an apparatus for drying the charged negative plates of storage batteries, a substantially airtight closed housing, comprised of upper and lower closed chambers, means in each of said chambers for supporting a plurality of plates, gas burner means in each chamber for initially exhausting the air in each of said chambers, valve operating means serving to discontinue the flow of gas to said burners, a plurality of infra-red light bulbs in each closed chamber, means for energizing said bulbs when the air in said chambers has been exhausted, temperature responsive means operatively connected to said infra-red light bulbs for maintaining a constant temperature in each chamber, and means for draining moisture extracted from said plates.

2. The structure of claim 1 wherein the means for supporting the plates comprise uprights, and transverse rods extending between said uprights, and adapted to support the plates being mounted on said transverse rods in a position offset from the vertical, whereby to permit free circulation of air and gases thereabout.

References Cited in the file of this patent

UNITED STATES PATENTS

| | | |
|---|---|---|
| 1,093,126 | Hadaway | Apr. 14, 1914 |
| 1,156,686 | Howard | Oct. 12, 1915 |
| 1,228,551 | Grant | June 5, 1917 |
| 1,439,994 | Benner | Dec. 26, 1922 |
| 1,716,320 | Pearson | June 4, 1929 |
| 1,749,819 | Hutchinson | Mar. 11, 1930 |
| 1,806,180 | Reinhardt | May 19, 1931 |
| 2,389,893 | Chubb et al. | Nov. 27, 1945 |
| 2,420,399 | New | May 13, 1947 |
| 2,529,704 | Olsen | Nov. 14, 1950 |
| 2,587,138 | Gillon | Feb. 26, 1952 |
| 2,619,577 | Jordan | Nov. 25, 1952 |
| 2,656,399 | Hindall et al. | Oct. 20, 1953 |
| 2,756,044 | Neuman | July 24, 1956 |

OTHER REFERENCES

Electrical World, Sept. 14, 1946, pages 150 and 152.